United States Patent
Su et al.

(10) Patent No.: US 10,601,944 B2
(45) Date of Patent: Mar. 24, 2020

(54) ACCURATE CACHING IN ADAPTIVE VIDEO STREAMING BASED ON COLLISION RESISTANT HASH APPLIED TO SEGMENT CONTENTS AND EPHEMERAL REQUEST AND URL DATA

(71) Applicant: Hughes Network Systems, LLC, Germantown, MD (US)

(72) Inventors: Chi-Jiun Su, Rockville, MD (US); Udaya Bhaskar, North Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/999,455

(22) Filed: Aug. 20, 2018

(65) Prior Publication Data

US 2019/0199818 A1   Jun. 27, 2019

Related U.S. Application Data

(63) Continuation of application No. 14/986,608, filed on Dec. 31, 2015, now Pat. No. 10,057,366.

(51) Int. Cl.

| G06F 15/167 | (2006.01) |
| H04L 29/08 | (2006.01) |
| H04B 7/185 | (2006.01) |
| H04N 21/433 | (2011.01) |
| H04N 21/231 | (2011.01) |

(Continued)

(52) U.S. Cl.
CPC ......... *H04L 67/2842* (2013.01); *H04B 7/185* (2013.01); *H04B 7/18523* (2013.01);
(Continued)

(58) Field of Classification Search
CPC ............. H04L 67/2842; H04L 67/2852; H04L 65/4084; H04L 65/601; H04L 65/4069;
(Continued)

(56) References Cited

U.S. PATENT DOCUMENTS 6,073,129 A  *  6/2000  Levine ................ G06F 12/0813
7,359,981 B2     4/2008  Horiuchi et al.
(Continued)

FOREIGN PATENT DOCUMENTS

KR   1020120069748   9/2014

OTHER PUBLICATIONS

"Squid: Optimising Web Delivery", http://www.squid-cache.org/.
(Continued)

*Primary Examiner* — Richard G Keehn
(74) *Attorney, Agent, or Firm* — Potomac Technology Law, LLC

(57) ABSTRACT

An approach for cached content identification for adaptive data streaming. A first request is received, requesting a current segment from a sequence of segments from a data file of a streaming data session. A NewVideoFlag is determined as indicating that the sequence of segments associated with the first request is not currently being cached. The first request is forwarded to a content server, and a first response message is received. A SegmentID of the received content segment is determined as not matching that of cached content segments. The NewVideoFlag is set to indicate that the segments from the streaming data session file are currently being cached. A global cVideoFileID is generated identifying the streaming session data file being cached. The content segment is cached, and cache bookkeeping is updated to associate the segment with the SegmentID and the cVideoFileID. The first response message is provided to the client device.

14 Claims, 9 Drawing Sheets

(51) Int. Cl.
  *H04N 21/2343* (2011.01)
  *H04N 21/44* (2011.01)
  *H04N 21/845* (2011.01)
  *H04L 29/06* (2006.01)

(52) U.S. Cl.
  CPC ..... *H04B 7/18578* (2013.01); *H04L 65/4069* (2013.01); *H04L 65/4084* (2013.01); *H04L 65/601* (2013.01); *H04L 67/2852* (2013.01); *H04N 21/23106* (2013.01); *H04N 21/23439* (2013.01); *H04N 21/433* (2013.01); *H04N 21/44004* (2013.01); *H04N 21/8456* (2013.01)

(58) Field of Classification Search
  CPC ............... H04B 7/18578; H04B 7/18523; H04B 7/185; H04N 21/8456; H04N 21/44004; H04N 21/23439; H04N 21/23106; H04N 21/433
  See application file for complete search history.

(56) References Cited

U.S. PATENT DOCUMENTS

| | | | |
|---|---|---|---|
| 8,966,359 B2 | 2/2015 | Gokhman et al. | |
| 9,501,365 B2* | 11/2016 | Parab | G06F 11/1453 |
| RE46,459 E | 6/2017 | Ikudome et al. | |
| 2011/0219208 A1* | 9/2011 | Asaad | G06F 15/76 712/12 |
| 2012/0191804 A1 | 7/2012 | Wright et al. | |
| 2013/0198313 A1* | 8/2013 | Hayton | H04L 67/2852 709/213 |
| 2014/0223029 A1 | 8/2014 | Bhaskar et al. | |
| 2015/0221063 A1 | 8/2015 | Kim et al. | |
| 2016/0182671 A1* | 6/2016 | Dakhane | H04L 65/605 709/219 |
| 2016/0300071 A1 | 10/2016 | Zhou et al. | |

OTHER PUBLICATIONS

Braun, et al., "Subresource Integrity", https://w3c.github.io/webappsec-subresource-integrity/.

Dreschler, "Hypertext Transfer Protocol: Improved HTTP Caching draft-drechsler-httpbis-improved-caching-00", May 16, 2014.

USPTO, "International Search Report and Written Opinion", PCT/US2016/069656, dated Mar. 27, 2017.

EPO, "Extended European Search Report", EP16882796.2 Extended ESR, dated Jul. 2, 2019.

* cited by examiner

ACCURATE CACHING IN ADAPTIVE VIDEO STREAMING BASED ON COLLISION RESISTANT HASH APPLIED TO SEGMENT CONTENTS AND EPHEMERAL REQUEST AND URL DATA

RELATED APPLICATIONS

This application is a continuation, and claims the benefit of the earlier filing date under 35 U.S.C. § 120, from U.S. application Ser. No. 14/986,608 (filed 2015 Dec. 31).

BACKGROUND

The overall capacities of broadband satellites are increasing exponentially, and such capacity increases present unique challenges in the associated ground system and network designs. The goal of the system designers, system operators, and service providers is to support and provide efficient, robust, reliable and flexible services, in a shared bandwidth network environment, utilizing such high capacity satellite systems.

According to recent internet traffic studies, media streaming traffic (e.g., video streaming) makes up more than 50% of forward link bandwidth from web servers to client devices, and more than 15% of the return link bandwidth from client devices to web servers. Further, the trend is moving upwards as more and more content providers start offering media (e.g., video) streaming services. For example, recent additions include HBO, CBS and other network and content provider streaming services. When a user watches or otherwise consumes a video, if the video is stored in a local storage device (e.g., a local cache) the streaming video content is provided directly from the local storage location. Alternatively, when the video content is not resident in a local storage device, the streaming content is provided over a wide area communications network or WAN (e.g., the Internet) from a remote content server. When the video is provided to the user or client device/application via adaptive video streaming, the user client device/application (e.g., a video player application running on a client personal computer or other media device) selects a playback rate and retrieves video segments of the respective playback rate from the content server via a request/response protocol. Further, such client playback devices/applications typically buffer a certain amount of content in order to provide the content from the local buffer at a consistent rate (thereby not having to rely on a consistent delivery rate over the WAN).

Typically, such content is addressed via a uniform resource locator (URL) or web address. The URL is a character string utilized as a reference to a web resource (e.g., an enterprise website or media content) that specifies the location of the resource on a computer network (e.g., the Internet) and a mechanism for retrieving it. Traditionally, with the caching of web content, such as streaming media content, the URLs have been used as cache keys for the HTTP objects in the cache. An HTTP object is a web resource transferred as an entity body in an HTTP response, and a cache key is an identifier to an HTTP object stored in the cache. In recent times, however, it has become commonplace to have more than one URL pointing to the same HTTP object. To solve this issue, recently URL de-duplication approaches have been devised in order maintain the feasibility of using the URL as a cache key for the respective HTTP objects. The main idea in URL de-duplication involves determination of identifiable strings in a URL that are unique to a respective HTTP object. Further, such unique identifiable strings may not be located in a URL, but instead may be located in HTTP request headers. In such cases, de-duplication approaches that rely on the URL alone to create a cache key may no longer work. Moreover, for security and prevention of pirating, providers of adaptive video streaming services have started obscuring the URL structure. The obscuring of the URL structure has resulted in URLs becoming ephemeral, where identifiable strings in the URL and HTTP header have become arbitrary and not necessarily unique.

In one current de-duplication approach, URLs are used as cache keys for HTTP objects in a squid caching proxy. See, e.g., squid-cache.org, "*Squid: Optimising Web Delivery*," http://www.squid-cache.org/. As an HTTP object may be represented by more than one URL in today's Web, several techniques have been provided in squid to de-duplicate those URLs, and to map all those URLs to a single cache key for a HTTP object. Examples of such squid features include "Store URL Rewriting" and "Store ID." The approaches require all URLs corresponding to the same HTTP object to include uniquely identifiable strings. Such approaches, however, as discussed above, may no longer work in the cases of intentionally obfuscated ephemeral URLs, as identifiable string in such URLs may not be unique. Furthermore, identifiable strings may not be located in the URLs, but instead may be included in HTTP header fields of the HTTP request.

In another recent approach, a solution is proposed that employs the use of a collision resistant hash (SHA-256) to identify an HTTP response body at a caching proxy. See, e.g., Chris Drechsler, "*Hypertext Transfer Protocol: Improved HTTP Caching*," IETF Internet-Draft, May 16, 2014 (http://tools.ietf.org/id/draft-drechsler-httpbis-improved-caching-00.txt). According to the approach, the hash is computed by the content server and is transferred as a new HTTP header field in the HTTP response. In contrast to the common HTTP caching operation, regardless of cache hit or cache miss, HTTP requests are sent to the content server and the caching proxy waits for an HTTP response to process. In the case of a cache miss, the HTTP response as well as the corresponding hash carried in HTTP response header is stored in the caching proxy, and the response is relayed to the client. In the case of cache hit, after receiving the whole HTTP response header, the caching proxy aborts the transfer of the HTTP response body by issuing TCP_RST to the content server. This proposed caching operation, however, exhibits deficiencies in that it does not reduce one round-trip-time (RTT) for the HTTP in case of a cache hit, and it also requires modification to the existing HTTP protocol (which would require modification of already available off-the-shelf devices and already deployed systems).

In a further approach, a solution is proposed that also adds a cryptographic hash to a web resource to provide integrity check. See, e.g., Frederik Braun, Devdatta Akhawe, Joel Weinberger, Mike West, "Subresource Integrity," W3C Editor's Draft, 2015 Jan. 8 (https://w3c.github.io/webappsec-subresource-integrity/). The hash is computed by the content server. It can provide a third party link to fetch the web resource. All the information, which includes a URL to a web resource, optionally a URL pointing to a third party site such as a CDN, hash algorithm, hash and content type, are provided by the original content server to a browser. To have security benefits, it is recommended that integrity metadata should be delivered via HTTPS. The approach requires the content server to provide the hash of the content. Caching based on the hash in integrity metadata can be done only when integrity metadata is transferred over HTTP. The specification is still in early stage at W3C and it is not clear that the content provider using obfuscated ephemeral URLs will apply the technique to enable caching.

What is needed, therefore, is an approach for effective and accurate content identification for caching of adaptive video streaming that does not require modification of existing video streaming protocols, such as HTTP and HTTPS.

Some Example Embodiments

The present invention advantageously addresses the foregoing requirements and needs, as well as others, by providing an approach for effective and accurate content identification for caching of adaptive video streaming that does not require modification of existing video streaming protocols, such as HTTP and HTTPS.

In accordance with example embodiments, an integrated streaming media caching approach is provided. The approach provides for the identification of web content (e.g., streaming media or video) for caching of the content by making use of both information of a corresponding HTTP request and information resulting from a collision resistant hash applied to the content of at least one of the initial video segments of the video file. By way of example, the HTTP URL and HTTP header fields in an HTTP request include two ephemeral IDs, one consisting of an identifier corresponding to the particular playback rate (PBR) video file and the video content ID or title and the other consisting of a permanent or global identifier corresponding to a respective video segment from the video file. With regard to the permanent or global video segment ID, although this ID would be unique among the segments of the respective video file, the ID may not necessarily be unique among segments of other video files or of all videos.

According to one such embodiment, without identifying a video file from which a particular video segment is from, when a caching proxy receives an HTTP request for a segment of the video file, the caching proxy forwards the request to the content server to retrieve the requested segment. Then, when the HTTP response is received with the requested segment, the caching proxy applies a collision resistant hash to the content of the received segment and to the segments stored in the cache, and compares the hash results to determine whether the segment is already stored in the cache. In that manner, although the ephemeral video file IDs of the content stored in the cache may differ from the IDs of the HTTP request, the hash of the content from the received video segment can be used to verify that the video segment is indeed from the same video file a corresponding segment stored in the cache. Once the matching video file is identified in the cache, no additional content hash matching is required for subsequent segment requests corresponding to that video file. If the segment ID of a following segment from the same video file is the same as that of a segment in the cache belonging to the same video file, the segment can be served from the cache. Further, with this approach employing the joint use of a content hash, the video file ID and the video ID, video segments of a video file and a video file corresponding to a particular video can be accurately identified.

Moreover, the same approach can be applied to other content types delivered in a similar fashion when segment IDs may not be unique.

In accordance with example embodiments, a method is provided for effective and accurate content identification for caching of adaptive video streaming. A caching proxy device receives a first request message of a respective client device, the first request message requesting a current content segment from a sequence of data segments of a data file for a current streaming data session of the client device. A NewVideoFlag is determined as indicating that the sequence of data segments of the data file for the current streaming data session associated with the first request message is not currently being, and has not previously been, stored in a cache storage by the caching proxy device. The first request message is forwarded to a content server, and a first response message is received in response to the first request message, the first response message including the requested current content segment. A SegmentID of the received current content segment is determined as not matching that of any content segments stored in the cache storage. The NewVideoFlag is set to indicate that the sequence of data segments of the data file for the current streaming data session associated with the first request message is currently being stored in the cache storage by the caching proxy device. A global video file identifier (cVideoFileID) is generated to identify the data file for the current streaming data session currently being stored in the cache storage by the caching proxy device. At least the current content segment is stored in the cache storage, and cache bookkeeping data is updated to associate the cached current content segment with the SegmentID thereof and with the generated cVideoFileID. The first response message is provided to the client device.

According to a further example embodiment of the method, the caching proxy device receives a second request message of the client device, the second request message requesting a subsequent content segment from the sequence of data segments of the data file for the current streaming data session of the client device. The NewVideoFlag is determined as indicating that the sequence of data segments of the data file for the current streaming data session associated with the second request message is currently being stored in the cache storage by the caching proxy device. A SegmentID of the requested subsequent content segment is determined as matching that of a content segment stored in the cache storage. The cVideoFileID is determined as matching that of the content segment stored in the cache storage with the matching SegmentID. The content segment with the matching SegmentID and the matching cVideoFileID is provided from the cache storage as a second response message to the client device.

In accordance with example embodiments, an apparatus is provided for effective and accurate content identification for caching of adaptive video streaming. The apparatus comprises a client device interface, a network communications interface, and a caching proxy element. The client device interface is operable to receive a first request message from a respective client device, the first request message requesting a current content segment from a sequence of data segments of a data file for a current streaming data session of the client device. The caching proxy element is operable to determine that a NewVideoFlag indicates that the sequence of data segments of the data file for the current streaming data session associated with the first request message is not currently being, and has not previously been, stored in a cache storage by the caching proxy element. The network communications interface is operable to forward the first request message to a content server, and to receive a first response message in response to the first request message, the first response message including the requested current content segment. The caching proxy element is further operable to determine that a SegmentID of the received current content segment does not match that of any content segments stored in the cache storage, to set the NewVideoFlag to indicate that the sequence of data segments of the data file for the current streaming data session associated with the first request message is currently being stored in the cache storage by the caching proxy element, and to generate a global video file identifier (cVideoFileID) to identify the data file for the current streaming data session currently being stored in the cache storage by the caching proxy device. The caching proxy element is further operable to store at least the current content segment in the cache storage, and to update cache bookkeeping data to associate the cached current content segment with the SegmentID thereof and with the generated cVideoFileID. The client device interface is further operable to provide the first response message to the client device.

According to a further example embodiment of the apparatus, The client device interface is further operable to receive a second request message of the client device, the second request message requesting a subsequent content segment from the sequence of data segments of the data file for the current streaming data session of the client device. The caching proxy element is further operable to determine that NewVideoFlag indicates that the sequence of data segments of the data file for the current streaming data session associated with the second request message is currently being stored in the cache storage by the caching proxy device. The caching proxy element is further operable to determine that a SegmentID of the requested subsequent content segment matches that of a content segment stored in the cache storage, and to determine that the cVideoFileID matches that of the content segment stored in the cache storage with the matching SegmentID. The client device interface is further operable to provide the content segment with the matching SegmentID and the matching cVideoFileID from the cache storage as a second response message to the client device.

Such embodiments of the present invention thereby facilitate accurate identification of video segments for caching of adaptive video streaming, identification of video segments and video files corresponding to a video in the context of caching of adaptive video streaming, and transparent operation without requiring any modification to content servers, clients and the protocol used between them. Further, an integrated approach is provided, using both content hash and information in a URL and HTTP header fields, which facilitates effective caching of adaptive video streaming with ephemeral URLs. Collision resistant properties of content hash accurately identifies a video segment while identifying strings in ephemeral URLs and HTTP header fields to provide accurate identification of the corresponding video file and the video for caching.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example, and not by way of limitation, in the figures of the accompanying drawings, in which like reference numerals refer to similar elements, and in which.

DETAILED DESCRIPTION

Systems and methods that facilitate effective and accurate content identification for caching of adaptive video streaming that does not require modification of existing video streaming protocols, such as HTTP and HTTPS, are provided. In the following description, for the purposes of explanation, numerous specific details are set forth in order to provide a thorough understanding of the present invention. The present invention is not intended to be limited based on the described embodiments, and various modifications will be readily apparent. It will be apparent that the invention may be practiced without the specific details of the following description and/or with equivalent arrangements. Additionally, well-known structures and devices may be shown in block diagram form in order to avoid unnecessarily obscuring the invention. Further, the specific applications discussed herein are provided only as representative examples, and the principles described herein may be applied to other embodiments and applications without departing from the general scope of the present invention.

Figure 1:
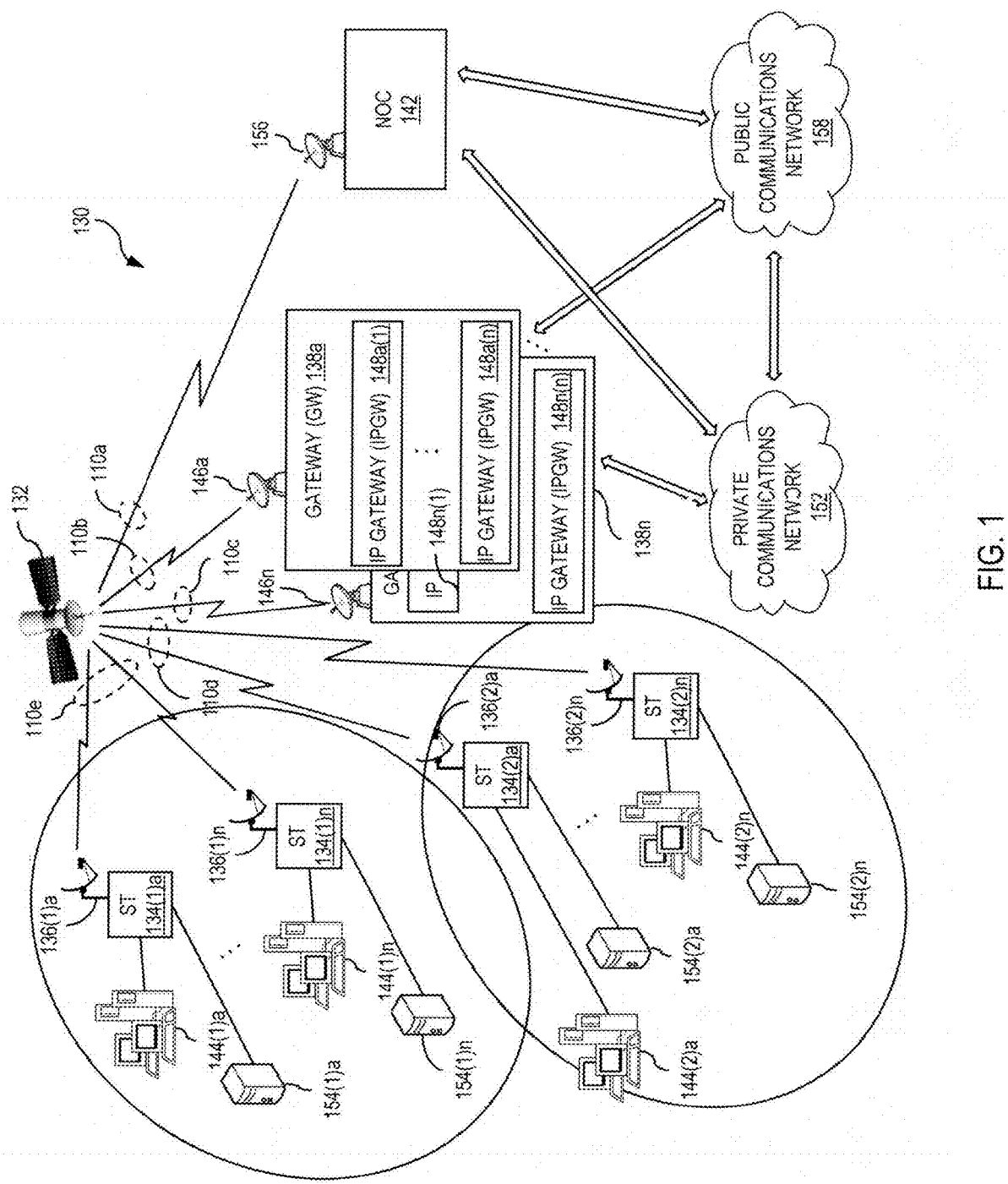
FIG. 1 illustrates a block diagram of a satellite communications system for providing adaptive streaming media services, in accordance with example embodiments.

FIG. 1 illustrates a block diagram of a satellite communications system for providing adaptive streaming media services, in accordance with example embodiments of the present invention. Satellite communications system 130 includes a satellite 132 that supports communications among multiple satellite terminals (STs) 134(1)a-134(1)n and 134(2)a-134(2)n, a number of gateways (GWs) 138a-138n, and a network operations center (NOC) 142. The STs, GWs and NOC transmit and receive signals via the antennas 136(1)a-136(1)n and 136(2)a-136(2)n, 146a-146n, and 156, respectively. According to different embodiments, the NOC 142 may reside at a separate site reachable via a separate satellite channel or may reside within a GW site, and alternatively the NOC 142 may comprise a distributed system that is distributed amongst a plurality of sites for purposes of distributed processing, scalability, etc. Further, as depicted, in a spot beam system, the satellite communicates with the various ground infrastructure (the STs, GWs and NOC) via a plurality of uplink and downlink spot beams 110a, 110b, 110c, 110d, 110e. By way of example, the NOC and each GW may each be serviced by a dedicated uplink and downlink spot beam pair, and the groups of STs (e.g., the group of STs 134(1)a-134(2)n and the group of STs 134(2) a-134(2)n) may each be serviced by a dedicated uplink and downlink spot beam pair as a group—a shared bandwidth architecture, where the STs share the respective uplink and downlink bandwidth of a spot beam amongst them. Each uplink beam and downlink beam covers a respective geographic area on the Earth that is shaped according to the respective antenna designs of the uplink and downlink antennae of the satellite. Further, the uplink beam of a particular coverage area need not be contiguous with a respective downlink beam of that area—but rather, for example, the coverage area of a particular uplink beam may be broken up and covered by multiple downlink spot beams. Additionally, the uplink and downlink spot beams may also be steerable for dynamic adjustment of capacity plans based on a geographic capacity demand distribution that changes over time.

The NOC 142 performs the management plane functions of the system 130, while the GWs 138a-138n perform the data plane functions of the system 130. For example, the NOC 142 performs such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC 142 communicates with each GW via the satellite 132, or via a secure private communications network 152 (e.g., an IPsec tunnel over a dedicated link or a virtual private network (VPN) or IPsec tunnel through a public network, such as the Internet). It should be noted that, according to one example embodiment, the traffic classification approaches of embodiments of the present invention address classification of data traffic flowing through an aggregation point or node. Additionally, each GW and the NOC have connectivity to one or more public communications networks, such as the Internet or a PSTN.

According to a further example embodiment, each of the GWs 138a-138n include one or more IP gateways (IP-GWs)—whereby the data plane functions are divided between a GW and its respective IPGWs. For example, GW 138a includes IPGWs 148a(1)-148a(n) and GW 138n includes IPGWs 148n(1)-148n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Whereas, the IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 142. The STs 134a-134n provide connectivity to one or more hosts 144a-144n and/or routers 154a-154n, respectively.

By way of example, the Satellite communications system 130 may operate as a bent-pipe system, where the satellite essentially operates as a repeater or bent pipe. In a bent-pipe system of an example embodiment, the satellite 132 operates as a repeater or bent pipe, whereby communications to and from the STs 134a-134n are transmitted over the satellite 132 to and from respective IPGWs associated with particular STs. Further, in a spot beam system, any one spot beam operates as a bent-pipe to a geographic region covered by the beam. For example, each spot beam operates as a bent pipe communications channel to and from the STs and/or IPGW (s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks). For example, content (e.g., streaming video content, such as a streaming movie) originating from a content server (not shown) may be provided to the GW 138a and the IPGW 148a(1). Then (via a broadcast beam or spot beam of the satellite 132) the content may subsequently be broadcast by the gateway 138a to the terminals 134a-134n within a respective broadcast beam of the satellite, or multicast to a subset of the terminals 134a-134n via a spot beam of the satellite. Further, while the content may be directed to one or more specific terminals (e.g., that requested the content), other terminals within the reception beam may opportunistically cache the content for the event that users of one or more of the other terminals subsequently request the content.

Figure 2:
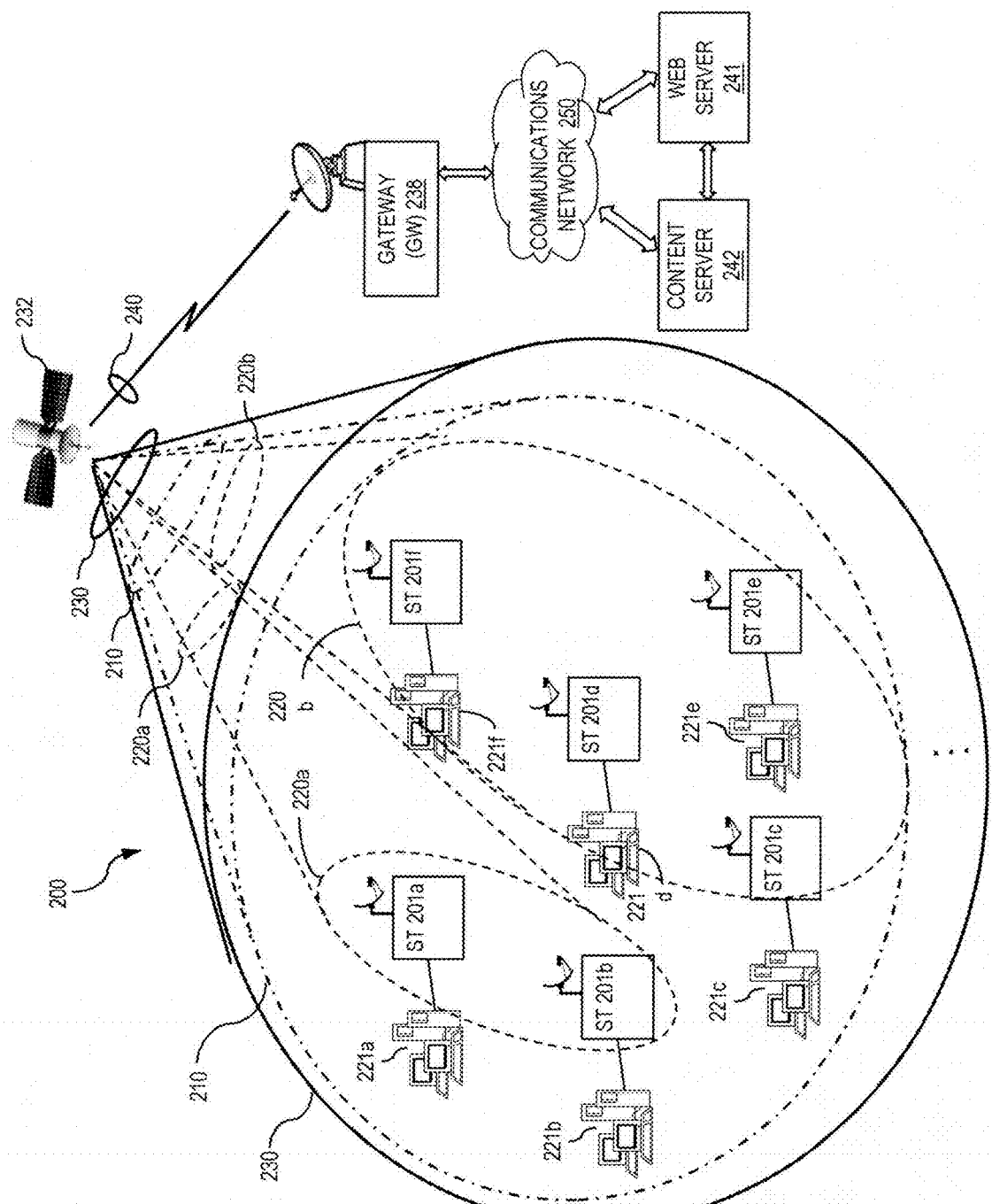
FIG. 2 illustrates a block diagram of a further satellite communications system for providing adaptive streaming media services, in accordance with example embodiments.

FIG. 2 illustrates a block diagram of a further satellite communications system for providing adaptive streaming media services, in accordance with example embodiments of the present invention. The system 200 comprises a satellite 232, a number of satellite client/user terminals ST201a, ST201b, ST201c, ST201d, ST201e, ST201f, . . . , a gateway 238, a communications network 250 (such as the Internet) and a web server 241, and a content server 242. By way of example, the web server 241 may be an enterprise web server, such as a Netflix Internet host server or an Apple Internet host server. By way of further example, the content server may be a general content server accessible directly over the Internet, or a specific enterprise content server, such as a Netflix content server utilized for storage of Netflix content and accessible via a Netflix Internet host server. As would be apparent to one of skill in the art, the communications system 200 need not be limited to just one gateway, one communications network, one web server, and one content server. For example, as depicted in FIG. 1, a number of gateways and IP gateways may respectively serve groups of the universe of terminals in the system. Further, content may be provided to the one or more gateways, via the communications network, from a multitude of web servers and content servers (with one or more content servers being provided by each of a number of content providers). Also, content from different content providers may be provided over different delivery networks—for example, a large corporate network may provide content to a multitude of corporate sites and corporate user terminals via the Internet (e.g., over a VPN) and/or a private corporate wide area network (WAN). Moreover, it would also be apparent to one of skill in the art that the system need not be limited to any specific maximum number of satellite terminals 201—the number of terminals would be governed by associated system design factors, such as satellite capacity, number of satellite beams, the number of gateways and IP gateways, the capacity management and terminal/client management systems of the network, etc. Further, as described above, with respect to uplink and downlink beams of the satellite, FIG. 2 depicts an uplink beam 210 and two downlink beams 220*a* and 220*b*. The STs 201*a*-201*f* are all serviced by the one uplink beam 210, while the STs 201*a*-201*b* are serviced by the downlink beam 220*a* and the STs 201*c*-201*f* are serviced by the downlink beam 220*b*. The satellite 232 further provides a broadcast capability via the downlink beam 230, which would cover a relatively large geographic area (e.g., the continental United State) containing multiple individual uplink and downlink beams over that coverage area.

Further, as depicted, in such a broadband communications system, comprising one or more satellite gateways, one or more satellites, and a plurality of client/user satellite terminals, the gateways communicate with content servers (e.g., web and application servers) via the communications network 250 (e.g., the Internet), and the client terminals transmit requests to and receive content responses from the gateways via channels or beams of the satellite. As used herein, a forward link refers to a communications path or channel from a gateway to the terminals, and a return link refers to a communications path or channel from a terminal to a gateway. Generally, all terminals within the coverage area of a forward link satellite beam can receive the data transmitted by a gateway over that forward link. Content is generally delivered from a content server to a client device via a request/response protocol. By way of example, Hypertext Transfer Protocol (HTTP) is a common example of such a request/response protocol. When a client wants to consume content, the client issues a content request to a content server. The request is received by the satellite terminal and the terminal transmits the request to the gateway that services the terminal via the respective return link channel. The gateway then relays the request to the content server. When the content receives the content request, it acquires or retrieves the content and streams the content back to the gateway via the communications network. The gateway then relays the content response to the requesting terminal/client via the forward link channel. In the event that the gateway content response broadcast by the gateway can be received by all the terminals in the satellite beam. The terminal then provides the content response to the client. During content delivery, both content requests and content responses go through the gateway and the terminal between a client and a content server.

By way of example, a user of a particular client terminal (e.g., the client terminal 221*a*) may request a specific content file, for example, a movie file via the user's Netflix account. As a result, the web browser client application of the terminal 221*a* would forward the request, addressed to the Netflix host server (e.g., the web server 241), to the ST 201*a*. The ST 201*a* first determines whether the requested content is already stored in its local cache, and if so, the ST provides the content to the respective client terminal directly from its cash. If the content is not a restored in the local cache of the ST 201*a*, the ST repackages or encapsulates the request with a source address of the ST 201*a* and a destination address of the respective gateway servicing the ST (e.g., the gateway 238), while maintaining the original source address of the client terminal and destination address of the web server within the encapsulated packet, and transmits the message over the satellite 232 to the gateway 238. The gateway receives the transmitted message, de-encapsulates it to obtain the originally intended destination address (that of the web server 241—in this case the Netflix Internet host server), re-encapsulates the request with a source address of the gateway 238 and a destination address of the web server 241 (while still maintaining the original source address of the client terminal and destination address of the web server within the encapsulated packet), and transmits the message over the communications network 250 to the web server. In response, the web server retrieves the movie content from the content server 242, and streams the content, via the communications network 250, to the gateway 238 (which was indicated to the web server as the immediate source of the request message). For example, the web server encapsulates the streamed content data with the web server as the immediate source address and the gateway as the immediate destination address, while including the web server as the original source address and the client terminal 221*a* as the ultimate destination address with the encapsulated data packets, and transmits the packets to the gateway 238 via the communications network 250. Alternatively, the web server may control the content server 242 to process and transmit the content data directly to the gateway via the communications network 250.

The gateway de-encapsulates the packets to obtain the intended destination address (that of the client terminal 221*a*) and resolves that address as being handled by the ST 201*a*, re-encapsulates the packets with a source address of the gateway 238 and a destination address of the ST 201*a* (while maintaining the original source address of the web server 241 and destination address of the client terminal 221*a* within the encapsulated packet), and transmits the packets to the satellite 232. Upon receiving the packets, the respective satellite transponder transmits the packets via the corresponding downlink beam/channel 220*a* for receipt by the ST 201*a*. The ST 201*a* receives the content data packets, de-encapsulates the packets to determine the appropriate address resolution and resolves the destination address as the client terminal 221*a*, and forwards the packets to the destination terminal. As would be recognized by one of skill in the art, such a system according to example embodiments would not be limited to any specific communications protocols, but rather may employ any of various different known communications formats or protocols for the exchange of the messaging and content over the various links of the network. For example, at the Internet layer, the standardized Internet Protocol (IP) may be applied for relaying datagrams across the network boundaries, by delivering packets from the source host to the destination host solely based on the IP addresses in the packet headers. Further, at the transport layer, any one of a number of known protocols may be employed, including Transmission Control Protocol (TCP), User Datagram Protocol (UDP), etc. Similarly, various well known protocols may be applied at the application and link layers.

Video and audio content is encoded into different formats such as VC-1, H.264, HEVC, WMA, ACC, DD, etc. For each encoding scheme, a single video content file will be encoded into several different files, each corresponding to different resolutions at different respective bit rates. For example, the different encoded video content files may range from 235 kbps to 16 Mbps and beyond. Generally, for a particular content video file, there will be several video files with different bit rates for each video encoding format and a couple of audio files of different bit rates for each different audio encoding formats. Typically, there will be about eight video files with different bit rate for each encoding scheme and a couple of audio files for different encoding scheme. Encoded video and audio files generally are also protected by digital rights management (DRM) schemes resulting in different DRM formats such as WMDRM, PlayReady, Widevine, etc. Further, each video and audio file is either virtually or physically divided into segments of some duration. By way of example, the segment duration may range from a couple of seconds to tens of seconds each segment. There are several segmentation techniques such as muxed ASF, unmuxed ASF, muxed M2TS, unmuxed M2TS, unmuxed FMP4, etc. Segmentation and packaging into different formats is also known as formatting into different "containers." The combination of video and audio encoding schemes, DRM methods and type of containers is known as a profile. A video is generally processed into several profiles and profiles are created to serve different platforms such as iDevice, Android, Roku, Xbox, PlayStation, etc. For further security, a common single encryption key is generally used for encrypting a video/audio file, and the key is typically the same for all users. The key is encrypted with a session key and is delivered to different users. As a result, video/audio files at a particular bit rate from a profile are identical for all the users. In practical applications, several video streaming services employ the foregoing approach of encoding and segmenting audio and video content files.

Figure 3:
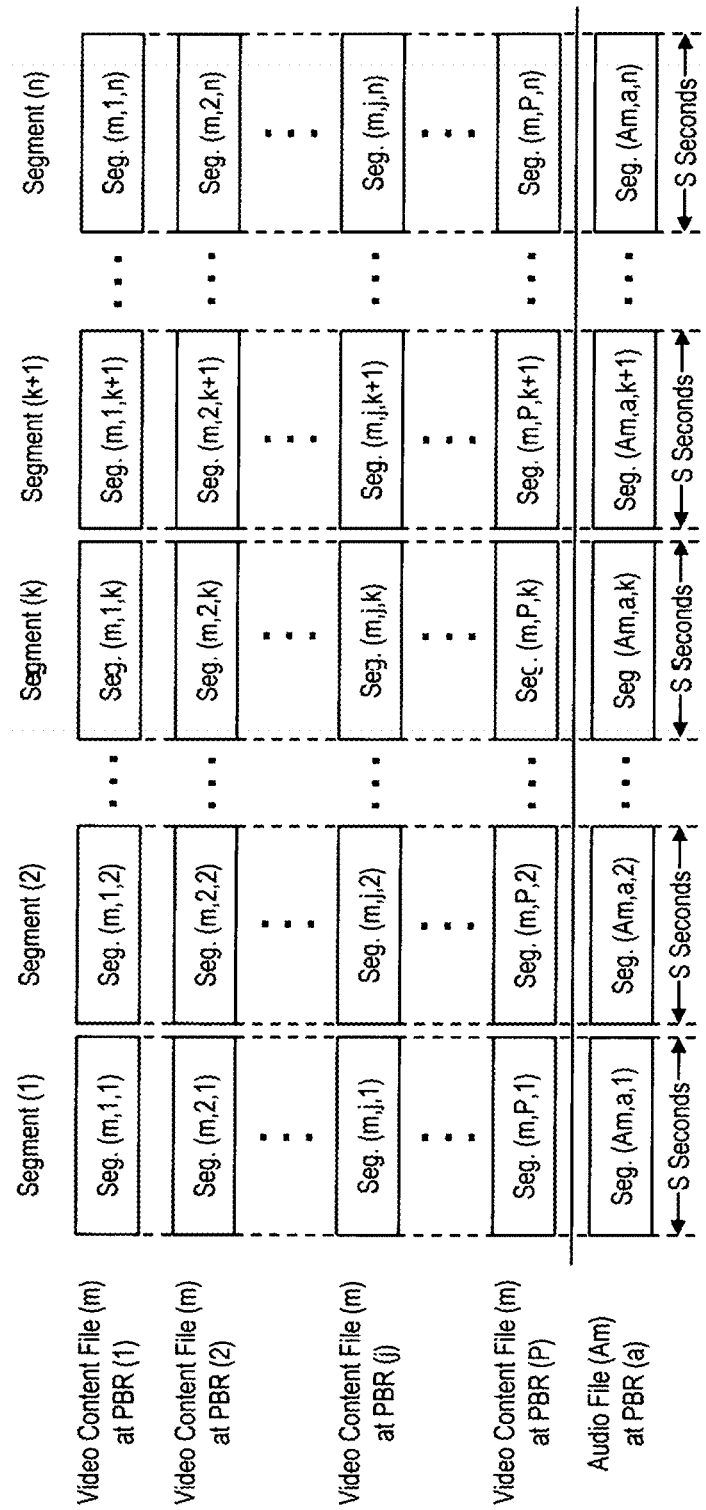
FIG. 3 illustrates the video segments of a plurality of different presentation or playback bit rate (PBR) video and audio files, in accordance with example embodiments.

FIG. 3 illustrates the video segments of a plurality of "P" different presentation or playback bit rate (PBR) files (PBR (1), PBR (2), . . . , PBR (j), PBR (P)), and an audio file "Am" of a PBR (a), for a particular profile of the video content file (m), in accordance with example embodiments of the present invention. A profile is determined by a combination of the video encoding scheme, audio encoding scheme, digital rights management (DRM) scheme and container format. In the example of FIG. 3, the video content file (m) comprises "P" video files (each of a different respective bit rate or PBR) and one audio file. Each video file and the audio file is composed of "n" segments, each of "S" seconds in duration. The nomenclature Seg. (x,y,z) represents the $z^{th}$ video segment of the video file of bit rate "y" of the video content file "x". For example, the segment Seg. (m,1,1) represents the first segment of the video file of PBR (1) of the video content file (m), Seg. (m,1,k) represents the $k^{th}$ segment of the video file of PBR (1) of the video content file (m), and so on. Similarly, the segment Seg. (m,j,1) represents the first segment of the video file of PBR (j) of the video content file (m), Seg. (m,j,k) represents the $k^{th}$ segment of the video file of PBR (j) of the video content file (m), and so on. Further, the segment Seg. (Am,1,1) represents the first segment of the audio file "Am" at PBR (a) for the video file (m), Seg. (am,1,k) represents the $k^{th}$ segment of the audio file at PBR (a) for the video file (m), and so on. Generally, in practice, for presentation or playback of a particular video content file, only a subset of the respective video segments is downloaded by the client device/application since not all of the segments are required for a playback.

Figure 4:
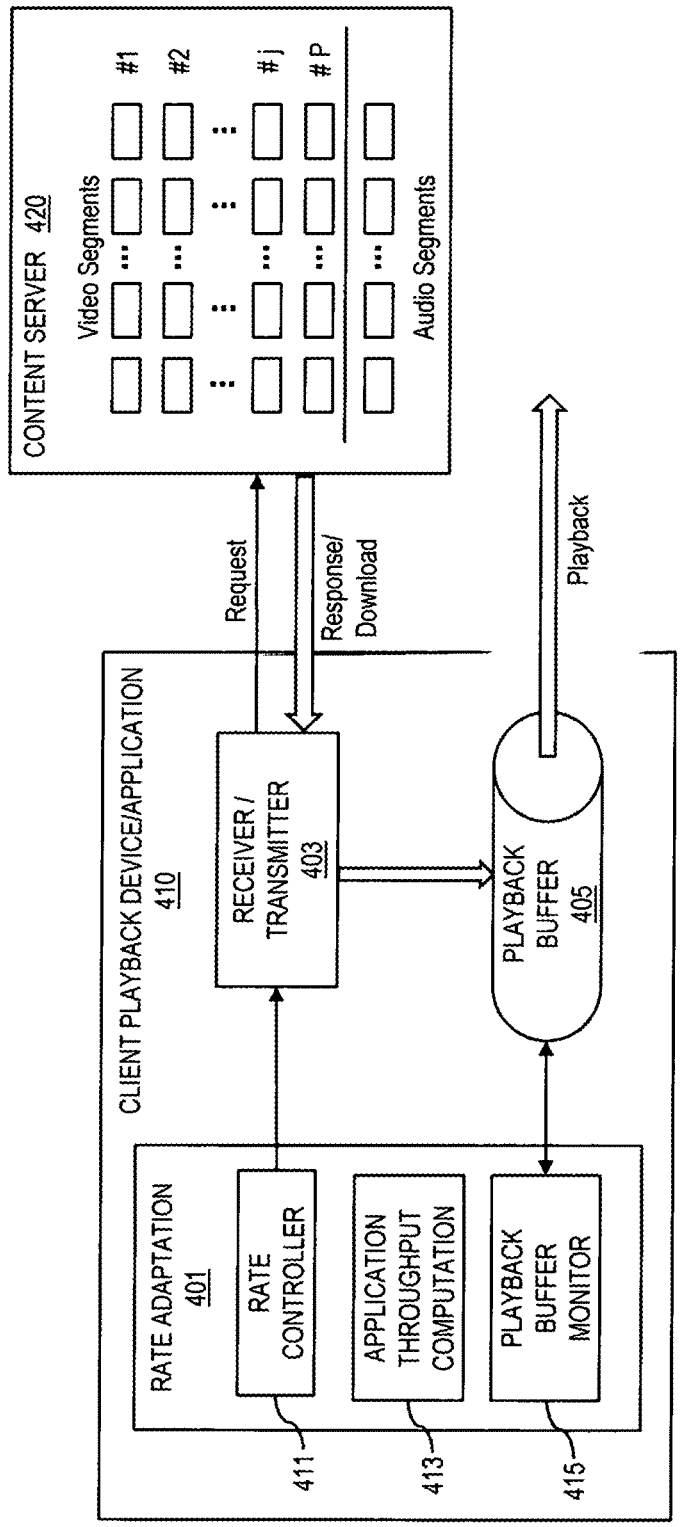
FIG. 4 illustrates a block diagram of a client playback device/application, which employs rate adaptation, in an adaptive media streaming system, in accordance with example embodiments.
Figure 5:
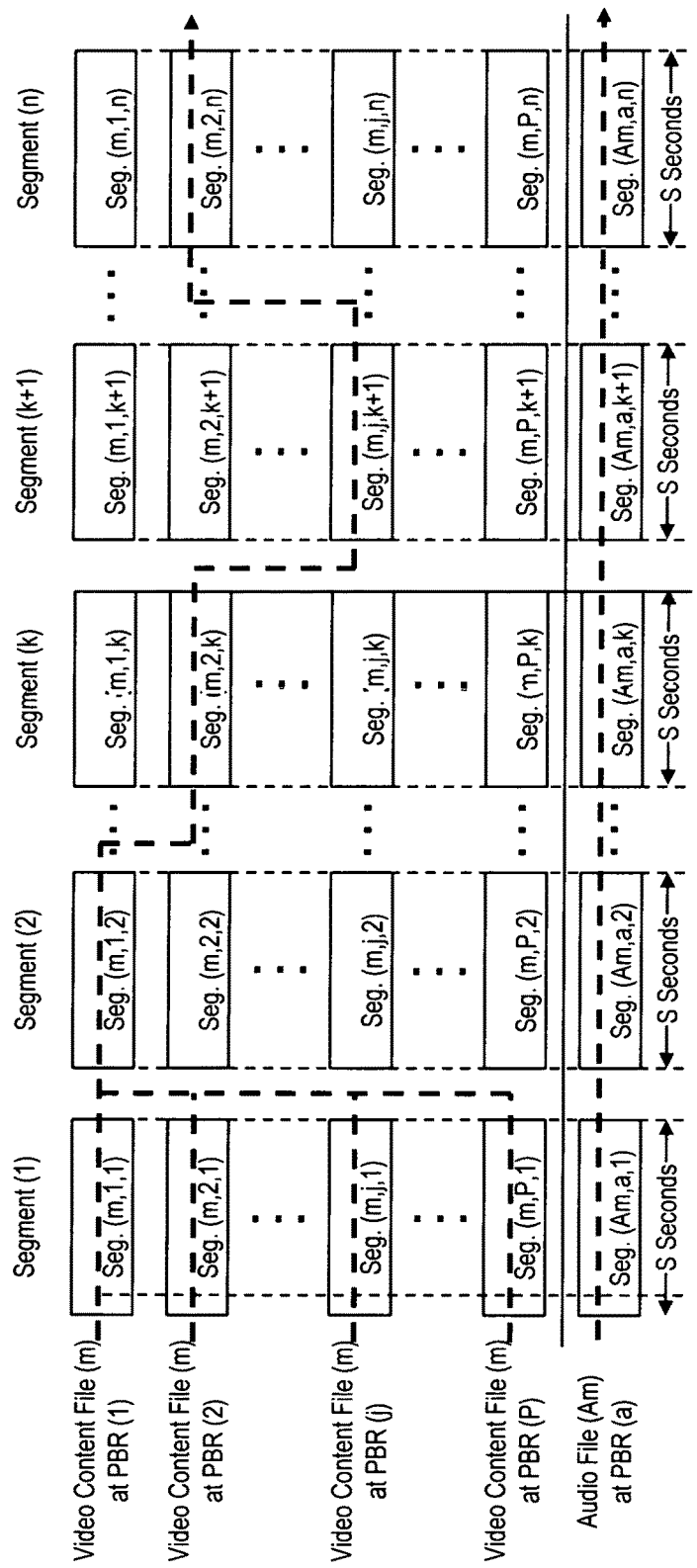
FIG. 5 illustrates a sequence of video segments downloaded by the client playback device/application of FIG. 4, for a video playback session employing adaptive video streaming, in accordance with example embodiments.

FIG. 4 illustrates a block diagram of a client playback device/application, which employs rate adaptation, in an adaptive media streaming system, in accordance with example embodiments of the present invention. FIG. 5 illustrates a sequence of video segments downloaded by the client playback device/application of FIG. 4, for a video playback session employing an adaptive video streaming process, where the dashed line reflects the download sequence, in accordance with example embodiments of the present invention. The client playback device/application 410 comprises a rate adaptation element 401, a receiver/transmitter 403, and a playback buffer 405. The rate adaptation element 401 comprises a rate controller 411, an application throughput computation unit 413, and a playback buffer monitor 415. The download sequence of the segments depends on the interaction between the playback device/application rate adaptation algorithm and the status of the various links of the download path through the network (e.g., link congestion and link margin or throughput rate—such as link margin or throughput rate of a satellite communications link based on weather conditions). Also, the download sequence or pattern may not be predictable as a user may arbitrarily stop, restart, forward and/or reverse playback at any time. The video streaming usually starts with control signaling between the playback device/application 410 and the control servers of the content provider (e.g., the content server 420 of FIG. 4).

By way of example, an adaptive video streaming session may employ HTTP and HTTPS protocols, such as HTTPS for control signaling and HTTP for the video and audio download. Accordingly, a cache sees the same video file at a particular bit rate for the same profile for all users consuming the content. The client playback device issues an HTTP GET request for a video/audio segment using the directory information provided in a manifest file downloaded earlier. The content server responds to the HTTP GET request with an HTTP response message containing the requested segment. Alternatively, HTTPS may also be used for video and audio download. The control signaling may include various request and response signaling (e.g., HTTP GET request and associated response messaging) and handshaking transmissions (e.g., TCP/IP handshaking) to establish the session and identify the desired video content file, and other control functions, such as security access and user authorization controls. Once the control signaling has been completed, the video and audio download begins and the playback device/application begins the buffering of the video and audio segments and the playback of the video content file.

A video streaming or playback session usually starts with control signaling between the client playback device and the control servers of the content/service provider as follows. The control signaling typically starts with user authentication and device authorization. For example, a user may be authenticated by account credentials (e.g., username and password, or other identification procedures to ensure the user is authorized to access the service). Device authorization would be required for services that restrict the number or type of devices that are authorized to access the services via the user's account. If required, a player software application download may then be necessary. Further, a player registration process may also be required. The session typically begins with a manifest file download, where the manifest file includes information on available video and audio streams of varying resolutions and bit rates, and the file locations (e.g., a directory of URLs for the respective video and audio files). Then a license file download occurs to provide decryption key(s) for the video and audio streams. Finally, the video and audio download starts and the client device buffers the segments and begins the playback.

With further reference to FIG. 4 and FIG. 5, as an example, playback device/application 410 typically downloads the first segments from each of the PBR video files and audio file(s) (as indicated by the dashed line through the first segment of each of the PBR video files of FIG. 5). The rate controller 411 then typically starts at the lowest bit rate, controlling the transmitter/receiver 403 to request further segments from the video file of the lowest PBR (as indicated by the dashed line through the second segment [Seg. (m,1,2)] of the PBR (1) video file of FIG. 5). The rate adaptation algorithm 401 continuously measures or estimates the available bandwidth and monitors its playback buffer status, via the application throughput computation element 413 and the playback buffer monitor 415, respectively. For example, application throughput can be computed for each downloaded segment by dividing the segment size by the respective download time, and available bandwidth can be estimated from application throughput statistics. The rate adaptation algorithm 401 will then determine whether a higher PBR can be sustained based on the bandwidth estimation and playback buffer status. In the event that the determination is positive, the rate adaptation algorithm will control the transmitter/receiver 403 to begin downloading further segments from the higher PBR video file and switch to the higher playback rate (as indicated by the dashed line through the $k^{th}$ segment [Seg. (m,2,k)] of the PBR (2) video file of FIG. 5). Generally, after an initial startup, when the network condition between the user client and the content server is stable, the playback usually stabilizes at a highest sustainable bit rate and stays there until the end of the video (as indicated by the dashed line through the $(k+1)^{th}$ segment [Seg. (m,j,k+1)] of the PBR (j) video file of FIG. 5). Even though apparently stable, the rate adaptation algorithm 401 may continue to measure/estimate the available bandwidth and monitor playback buffer status. Accordingly, if network conditions diminish during playback, the rate adaptation algorithm may detect a reduction of available bandwidth and a resulting continued reduction of buffered video segments. In this instance, the rate adaptation algorithm may determine that the current PBR can no longer be sustained, and will accordingly control the transmitter/receiver 403 to begin downloading further segments from the lower PBR video file and switch to the lower playback rate (as indicated by the dashed line through the $n^{th}$ segment [Seg. (m,2,n)] of the PBR (2) video file of FIG. 5).

Figure 6:
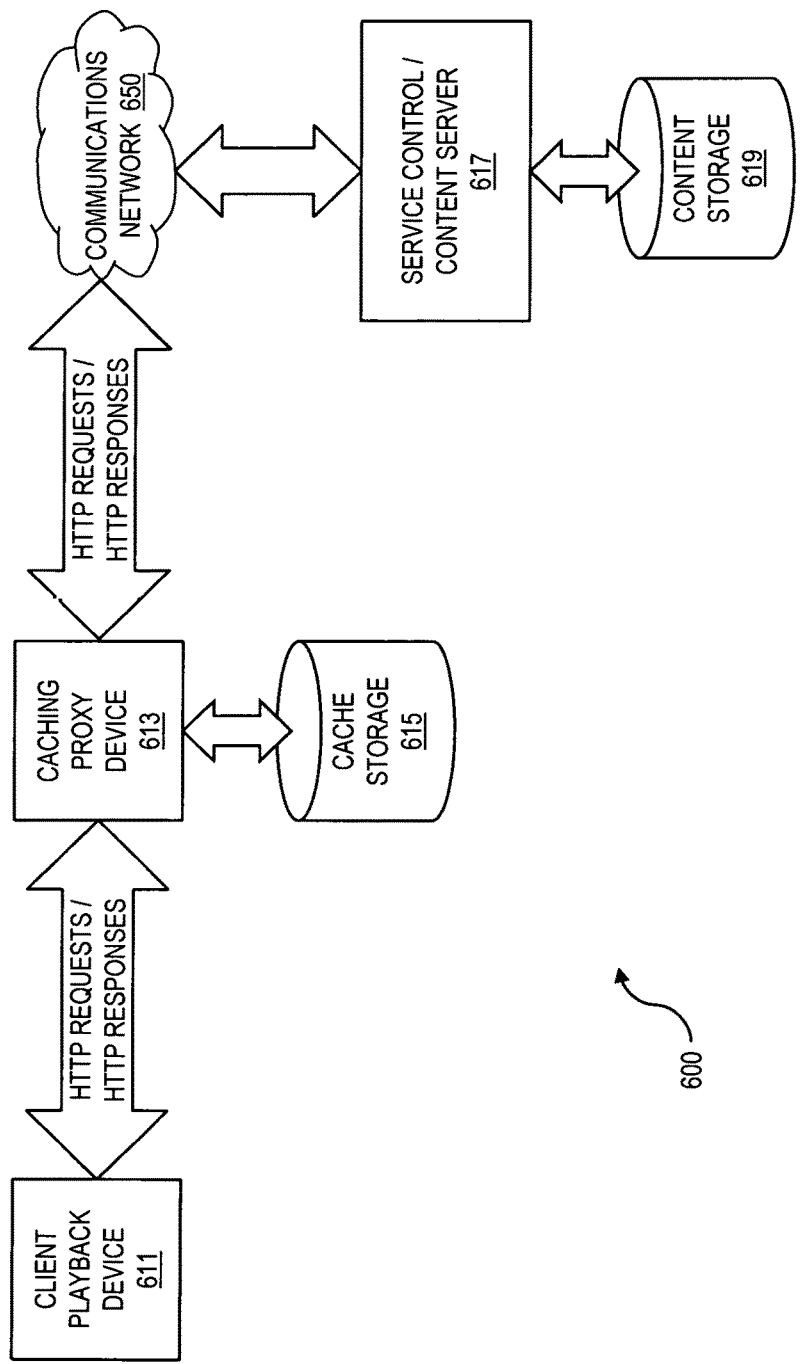
FIG. 6 illustrates a block diagram of a caching system, in accordance with example embodiments.

FIG. 6 illustrates a block diagram of a caching system, in accordance with example embodiments of the present invention. The system 600 includes a client playback device 611, a caching proxy device 613, cache storage 615, a service control/content server 617, content storage 619, and the communications network 650 (e.g., the Internet). When a subscriber wishes to access a streaming media service, the subscriber logs into a respective service account, accesses the media service via the client playback device 611, and selects the desired video content title. As would be recognized by one of ordinary skill in the art, the client playback device may consist of a personal computer or other mobile PC device (e.g., lap-top, tablet computer, mart phone, etc.) or any other media playback device (e.g., DVD player, Blue-Ray player, X-Box, PlayStation, etc.). Once all the initial control signaling is completed, the client playback device 613 first receives the manifest file download, as described above, which identifies the video and audio streams of varying resolutions and bit rates, and the respective file URLs. The client playback device then begins issuing HTTP requests for the desired video content file segments (using the appropriate URLs for the video and audio files of the desired playback rates). The caching proxy device 613 intercepts the HTTP requests, analyzes the requests, and determines whether the requested video file is already resident in the cache storage 615 (as described in further detail below). In the event that the requested video file is resident in the cache storage 615, the caching proxy device retrieves the requested video file segments from the cache storage, and serves them to the client playback device as respective HTTP response messages. Alternatively, in the event that the requested video file is not resident in the cache storage 615, the caching proxy device forwards the HTTP requests (via the communications network 650) to the service control/content server 617 of the service provider. The service control/content server retrieves the requested video file segments from the content storage 619, and forwards the requested segments back to the caching proxy device as respective HTTP response messages. Upon receiving the HTTP response messages from the content server 617, the caching proxy device caches the content segments in the cache storage 615, and serves the requested segments to the client playback device as respective HTTP response messages (as described in further detail below). With regard to FIG. 6, although the caching proxy device 613 and cache storage 615 are depicted as serving the one client playback device 611, it would be recognized that the caching proxy may serve multiple client devices. By way of example, the caching proxy may serve multiple client devices at a single customer premise. By way of further example, the caching proxy device may serve multiple client devices of multiple different customers or subscribers—for example, the caching proxy may be located at an Internet Service Provider (ISP) site or media service provider (MSP) site, and service multiple customers or subscribers to the ISP or MSP. Because the data segments of the different streaming media or streaming data sessions of the respective client devices could be associated with cached data segments of corresponding media or data files via a global identifier (e.g., the cVideoFileID), the identification of the cached content according to example embodiments of the present invention could be applied globally across the multiple client devices by the single caching proxy device and respective cache storage(s). Additionally, via a wide area communications network (e.g., the Internet), the single caching proxy could service streaming data sessions serviced by multiple different content providers and respective content servers.

The URLs in the HTTP requests include certain information regarding the requested video content file or title, and the specific video file for the requested playback rate (PBR), which, nowadays (as discussed above), have become ephemeral with no uniquely identifiable character strings due to intentional obscuring efforts (based on DRM processes) employed by the content providers. By way of example, the HTTP URL and respective HTTP header fields of the HTTP request will include an ephemeral identifiable character string reflecting or based on an identifier for the video/audio file of the requested PBR or profile (for purposes hereof, this identifier will be referred to as the "VideoFileID"). By way of further example, the HTTP URL and respective HTTP header fields of the HTTP request will also include an ephemeral identifiable character string reflecting or based on an identifier for the video content file or video title (for purposes hereof, this identifier will be referred to as the "VideoID"). By way of further example, the HTTP URL and respective HTTP header fields of the HTTP request will also include an ephemeral permanent or global identifiable character string representing the respective requested segment of the video/audio file (of the desired PBR or profile) (for purposes hereof, this identifier will be referred to as the "SegmentID"). The terminology permanent or global used in the context of the SegmentID indicates that the identifier is global in the sense that it references the same segment of the video file across different streaming data sessions potentially across multiple client devices (whereas the obfuscated video file and video title identifiers are not global across different sessions and devices). The VideoFileID and VideoID are ephemeral in a sense that they remain the same within a playback session, but will be completely different in any further or other sessions involving the same content (even if the further session is with the same subscriber and client playback device). In other words, the VideoFileID and VideoID can be used to uniquely identify a video/audio file within a respective session only. Further, the SegmentID is permanent and can be used as an identifier for a segment in the same video file at any time (e.g., even across sessions)—the SegmentID is unique for segments of a video file, but may not be unique for segments across different video files (of different profiles) or across different videos (different content titles). The segment of a video file, therefore, cannot be accurately identified by using the VideoFileID, VideoID and SegmentID alone, because an incorrect video segment may be identified by a common VideoFileID, VideoID and SegmentID due to a collision of the SegmentID.

In accordance with example embodiments, therefore, a video file is identified based on a collision resistant hash applied to the content of a segment. By way of example, the collision resistance hash may be the commonly known SHA-1 or SHA-2 hash functions. Further, as would be recognized by one of ordinary skill in the art, any other collision resistant hash may be utilized without departing from the overall scope of the present invention. Once identified in that manner, for the respective session, the file can be associated with the respective VideoFileID and VideoID, and the segments within that file are identified by the respective Segment IDs. In other words, after verification based on application of the collision resistant hash to the content of a video file segment, the VideoFileID, VideoID and SegmentID can be used to identify the subsequent segments of the same video/audio file of the respective session. Further, because the VideoFileID and VideoID are ephemeral, according to such example embodiments, respective identifiers (for purposes hereof referred to as cVideoFileID and cVideoID) are assigned as permanent or global IDs to keep track of the VideoFileID and VideoID, respectively, of the video file segments stored in the cache (referred herein, in a general sense, as cache bookkeeping data). Here also, as with the SegmentID discussed above, the terminology permanent or global ID used in the context of the cVideoFileID and cVideoID indicates that the identifiers are assigned as global IDs in the sense that they reference the video file and video title across different streaming data sessions potentially across multiple client devices. This is in order to be able to track the video segments of a current video streaming session against the video segments stored in the cache that may potentially belong to the same video file (even though from a different session). The cVideoID is a permanent video ID assigned to identify the segments corresponding to particular video/audio files (profiles or PBR) of a video, where each cVideoFileID identifies the set of segments belonging to a particular video/audio file and thus can be used to identify the requested video file segments. Additionally, for each video file, a variable (for purposes hereof referred to as NewVideoFlag) is used to tell whether or not the video file has already been identified and mapped to respective permanent IDs. It should also be noted that SegmentIDs of the very first segment of a video/audio file (e.g., at one PBR) may have the same value as the Segment ID for the first segment of a different video/audio file (e.g., at another PBR) for the same video content or title—such segments may not carry any of the audio/video content, but rather carry metadata regarding the respective video/audio files—accordingly, in order to avoid content hash collisions, such segments should not be used for content hashing.

Figure 7:
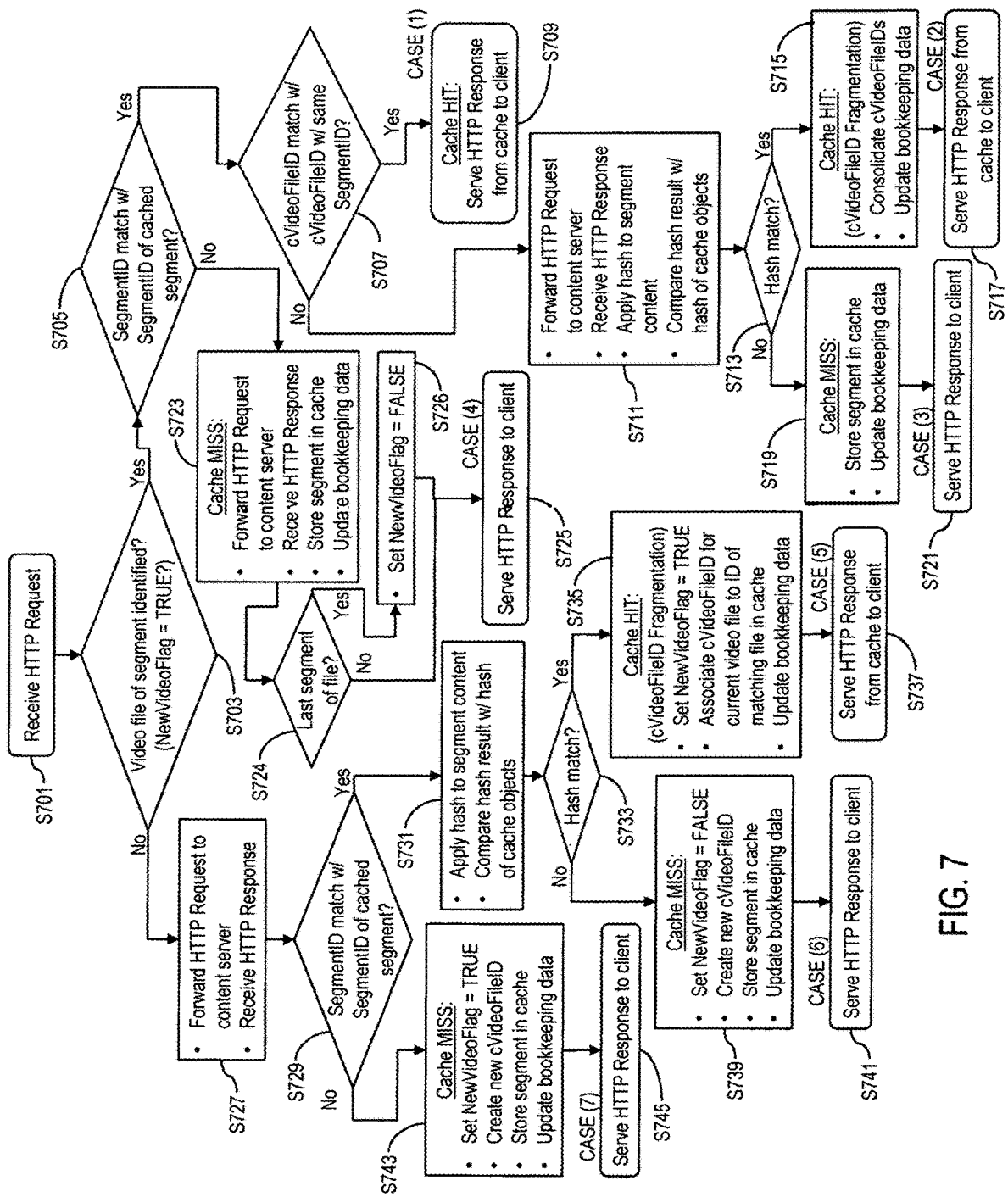
FIG. 7 illustrates a flowchart of a caching algorithm, for adaptive streaming media services in an adaptive media streaming system, in accordance with example embodiments.

FIG. 7 illustrates a flowchart of a caching algorithm, for adaptive streaming media services in an adaptive media streaming system, in accordance with example embodiments of the present invention. According to such embodiments, in a first step, after completion of any control and authorization signaling and receipt of the manifest file for a requested video file, the process starts at the caching proxy with the receipt of an HTTP Request message from the client playback device (S701). Then, at Step S703, the caching proxy determines whether a video file for the segment has already been identified (if the NewVideoFlag=TRUE?). If the NewVideoFlag is currently set to TRUE (Yes at Step S703), this indicates that a previous HTTP response or segment has been identified and associated with a permanent cVideoFileID. From here, according to the depicted process, there are two main branches from the receipt of the HTTP request, depending on whether or the requested video file has been previously identified and associated with a permanent ID. From these two branches, several permutations are possible, with the individual permutations being triggered based on a combination of any applied rate adaptation algorithm, network conditions and the client/user's actions. According to the depicted embodiments, the permutations can be generally summarized in seven scenarios or CASES (each depicted in a separate branch of the flowchart provided in FIG. 7).

By way of example, for the CASE (1), in the event the cache proxy determines that a video file for the segment has been identified (NewVideoFlag=TRUE)(Yes at Step S703), the proxy then determines whether the current Segment ID matches the SegmentID of any of the cached segments (S705). In the event that the cache proxy determines that the Segment ID of the current segment matches the ID of one or more of the segments stored in the cache (Yes at Step S705), the proxy then determines whether the assigned permanent cVideoFileID matches that of any of the cached segments with the matching SegmentID (S707). In the event that the cache proxy determines that the permanent cVideoFileID matches the cVideoFileID of one of the cached segments with the matching SegmentID (Yes at Step S707), a Cache HIT is determined, and the proxy serves the HTTP Response from the cache storage to the client playback device (S709). Accordingly, in this CASE (1), the HTTP response is served from the cache without requiring the forwarding of the HTTP Request to the content server and waiting for the HTTP Response to provide the requested Video segment.

By way of further example, for the CASE (2), in the event that the proxy determines that the permanent cVideoFileID does not match that of any of the cached segments with the matching SegmentID (No at Step S707), the cache proxy (i) forwards the HTTP Request to content server, (ii) receives an HTTP Response, (iii) applies the hash to segment content of the HTTP Response, and (iv) compares the hash result with that of the cached segments (S711). The cache proxy then determines whether the hash result from the HTTP Response segment matches the hash of any of the cached segments (S713). In the event that the cache proxy determines a match (Yes at Step S713), a Cache HIT is determined, but it is also determined that there is a case of cVideoFileID fragmentation (S715)—which occurs when segments from a video file are stored for a different video playback session resulting in different cVideoFileIDs for the same segment. In this case, the cache proxy consolidates the differing cVideoFileIDs and updates the cache bookkeeping data, including, for example, updating the permanent cVideoFileID for the requested segments of the current video streaming session to the cVideoFileID of the matching segment from the cache (in this manner, the future cVideoFileIDs for the subsequently requested segments will result in a match at Step S707). The cache proxy then serves the HTTP Response from the cache storage to the client playback device (S717). Accordingly, in this CASE (2), while the HTTP response may be served from the cache, it may also be served from the received HTTP response—However, in view of the consolidation of the cVideoFileIDs, the subsequent segments should fall into the CASE (1) and be served directly from the cache without having to retrieve the segments from the server.

Alternatively, for the CASE (3), in the event that the cache proxy determines that the hash result from the HTTP Response segment does not match the hash of any of the cached segments (No at Step S713), a Cache MISS is determined, and the proxy stores the received segment from the HTTP Response in the cache storage and updates the cache bookkeeping accordingly (S719). The cache proxy then serves the received HTTP Response to the client playback device (S721).

By way of further example, for the CASE (4), in the event that the cache proxy determines that the Segment ID of the current segment does not match the SegmentID of any of the segments stored in the cache (No at Step S705), a Cache MISS is determined, and the cache proxy (i) forwards the HTTP Request to content server, (ii) receives an HTTP Response, (iii) stores the segment content from the HTTP Response in the cache storage, and (iv) updates the cache bookkeeping records accordingly (S723). The cache proxy then determines whether the HTTP response contained the last segment of the video file of the current session (S724). In the event that the cache proxy determines that the HTTP response did not contain the last segment of the video file of the current session (No at Step S724), the proxy serves the received HTTP Response to the client playback device (S725). Alternatively, in the event that the cache proxy determines that the HTTP response did contain the last segment of the video file of the current session (Yes at Step S724), the proxy sets the NewVideoFlag=FALSE (S726) The cache proxy then serves the received HTTP Response to the client playback device (S725).

By way of further example, for the CASE (5), in the event the cache proxy determines that a video file for the segment has not yet been identified (NewVideoFlag=FALSE)(No at Step S703), the proxy then forwards the HTTP Request to content server, and receives an HTTP Response (S727). The cache proxy them determines whether the SegmentID of the segment received in the HTTP Response matches the SegmentID of any of the cached segments (S729). In the event that the cache proxy determines that the SegmentID of the segment received in the HTTP Response matches the SegmentID of a cached segment (Yes at Step S729), the proxy applies the hash to the segment content from the HTTP Response, and compares the hash result with that of the cached segments (S731). The cache proxy then determines whether the hash result from the HTTP Response segment matches the hash of any of the cached segments (S733). In the event that the cache proxy determines a match (Yes at Step S733), a Cache HIT is determined, but it is also determined that there is a case of cVideoFileID fragmentation (S735). In this case, the cache proxy (i) sets NewVideoFlag=TRUE, and (ii) associates the new video file to matching file in the cache and updates the cache bookkeeping data, including setting the cVideoFileID for the current video file to the cVideoFileID of the matching segment in the cache (S735). The cache proxy then serves the HTTP Response from the cache storage to the client playback device (S737). Accordingly, in this CASE (5) (as with the CASE (2), while the HTTP response may be served from the cache, it may also be served from the received HTTP response—However, in view of the cVideoFileID for the current video file being set to that of the matching cache segment, the subsequent segments should fall into the CASE (1) and be served directly from the cache without having to retrieve the segments from the server.

Alternatively, for the CASE (6), in the event that the cache proxy determines that the hash result from the HTTP Response segment does not match the hash of any of the cached segments (No at Step S733), a Cache MISS is determined, and the proxy (i) sets the NewVideoFlag=FALSE, (ii) creates a new cVideoFileID for the current video file, (iii) stores the segment content from the HTTP Response in the cache storage, and (iv) updates the cache bookkeeping records accordingly (S739). The cache proxy then serves the received HTTP Response to the client playback device (S741).

By way of further example, for the CASE (7), in the event that the cache proxy determines that the Segment ID of the current segment does not match the SegmentID of any of the segments stored in the cache (No at Step S729), a Cache MISS is determined, and the cache proxy (i) set the NewVideoFlag=TRUE, (ii) creates a new cVideoFileID for the current video file, (iii) stores the segment in the cache, and (iv) updates the cache bookkeeping data accordingly (S743). The cache proxy then serves the received HTTP Response to the client playback device (S745).

As reflected by the flowchart of FIG. 7, the CASES (3), (4), (6), (7) represent scenarios when the cache storage 619 is being filled with segments of a new video file. Caching of the first content segment of the video file generally occurs with the CASE (7), where the NewVideoFlag=FALSE, and the SegmentID of the first content segment does not match the SegmentID of any cached segments. In this case, because current video file has not previously been cached, the cache is just beginning to be filled with the new video file—thus, the NewVideoFlag is set to TRUE, and a new cVideoFileID is created for the new video file. Further, the first content segment of a particular video file (a particular profile or PBR) may be any segment of the current video title, as the applied rate adaptation (e.g., applied at the client playback device) may select a new bit rate file anywhere during the playback session, which then triggers a request for a first segment of the updated rate file (which may be anywhere within the sequence of segments in the file, depending on when the rate switch occurs). The CASE (6) considers a scenario of a SegmentID collision for the first content segment of a new video file, where the SegmentID of the first content segment collides with the SegmentID of a cached segment of a different video file (there is no content hash match). In other words, there is a segment stored in the cache with the same SegmentID for a different flow or video file. After processing the first segment of a video file (e.g., in the CASES (6) or (7)), the caching of subsequent segments generally continues with the CASE (4)—where the NewVideoFlag=TRUE, but there is no SegmentID match with any of the cached segments (the current segment is a new segment for a video file that is currently in the process of first being cached). Note that, if there is a SegmentID match, but no cVideoFileID match, then the content is fetched from the server to determine whether there is a content hash match—and if so, there is a case of fragmentation (CASE (2)), and if not, it is a cache miss (CASE (3)).

As also reflected by the flowchart of FIG. 7, the CASES (5) and (2) correspond to scenarios of cVideoFileID fragmentation. In such scenarios, segments of a video file are requested during different playback sessions. For example, in CASE (5), a content hash match occurs even though the NewVideoFlag was set to FALSE (No in Step S703), and in CASE (2), a content hash match occurs even though there weren't matching cVideoFileIDs (No in Step S707). Because the segments are from different sessions, some segments are associated with a value of cVideoFileID, while others are assigned to a different value of cVideoFileID, even though the segments belong to the same video file. In either case, the hash of the segment content verifies that the segment is already stored in the cache, but with a different cVideoFileID. When such fragmentation cases occur, the segments with different values of cVideoID are consolidated to a single cVideoFileID, and the subsequent segments can be served directly from the cache storage.

In Case (1), when the NewVideoFlag=TRUE, the current requested SegmentID matches a SegmentID of a cached segment, and the cVideoFileIDs match, the requested content segments are already stored in the cache. The segments are then served to the client device from the cache without forwarding the HTTP Requests to the content server and waiting for respective HTTP Responses.

Figure 8:
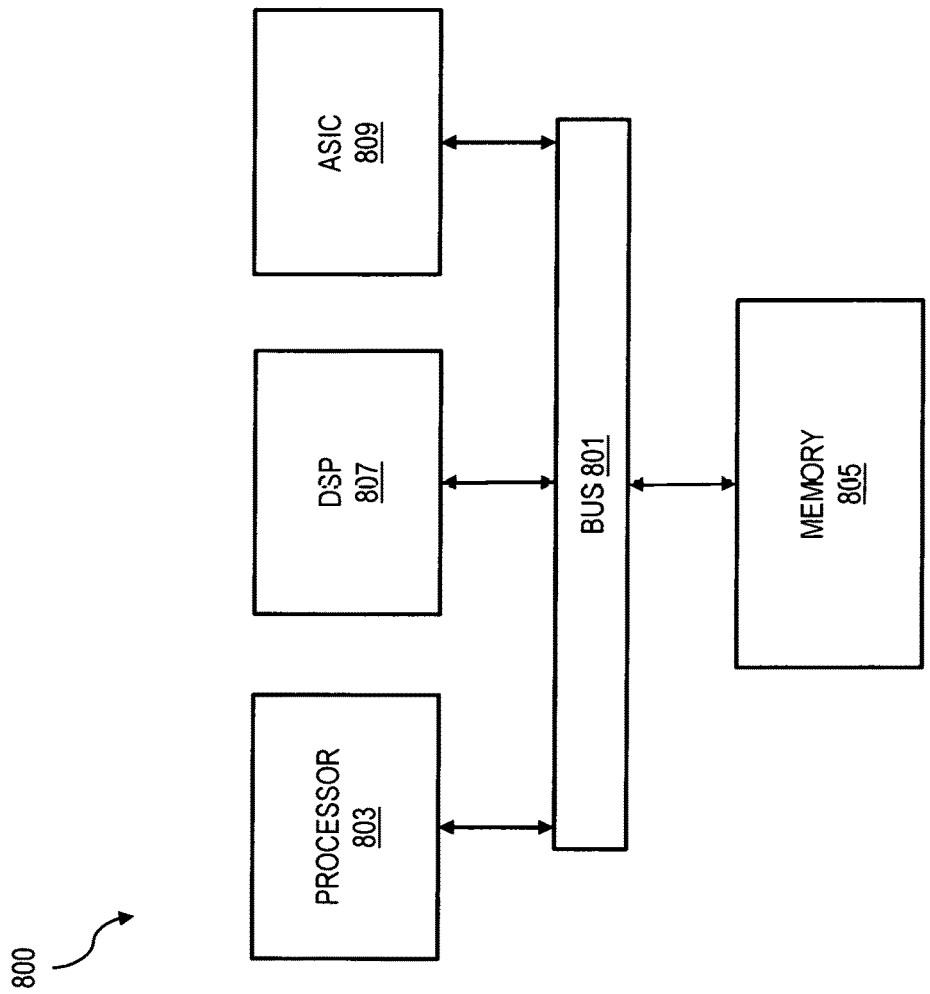
FIG. 8 illustrates a block diagram of a chip set implementing aspects of accurate streaming media caching approaches, in accordance with example embodiments.

FIG. 8 illustrates a block diagram of a chip set 800 implementing aspects of effective and accurate content identification for caching of adaptive video streaming, in accordance with example embodiments of the present invention. Chip set 800 includes, for instance, processor and memory components incorporated in one or more physical packages. By way of example, a physical package includes an arrangement of one or more materials, components, and/or wires on a structural assembly (e.g., a baseboard or printed circuit board) to provide one or more characteristics such as physical strength, conservation of size, and/or limitation of electrical interaction.

In one embodiment, the chip set 800 includes a communication mechanism such as a bus 801 for passing information among the components of the chip set. A processor 803 has connectivity to the bus 801 to execute instructions/programs and process information stored in, for example, a memory 805. The processor may include one or more processing cores with each core configured to perform independently. A multi-core processor enables multiprocessing within a single physical package, such as two, four, eight, or greater numbers of processing cores. Alternatively or in addition, the processor may include one or more microprocessors configured in tandem via the bus to enable independent execution of instructions, pipelining, and multithreading. The processor may also be accompanied with one or more specialized components to perform certain processing functions and tasks such as one or more digital signal processors (DSP) 807, and/or one or more application-specific integrated circuits (ASIC) 809. A DSP typically is configured to process real-time signals (e.g., sound or video) in real time independently of the processor. Similarly, the ASIC can be configured to performed specialized functions not easily performed by a general purpose processor. Other specialized components to aid in performing the inventive functions described herein may include one or more field programmable gate arrays (FPGA) (not shown), one or more controllers (not shown), or one or more other special-purpose computer chips.

The processor 803 and accompanying components have connectivity to the memory 805 via the bus 801. The memory may include both dynamic memory (e.g., RAM) and static memory (e.g., ROM) for storing executable instructions that, when executed by the processor and/or the DSP 807 and/or the ASIC 809, perform the process of example embodiments as described herein. The memory may also store the data associated with or generated by the execution of the process.

Further, the functionality of the example embodiments of the present invention may be provided by the chip set 800, in response to the processor 803 executing an arrangement of program instructions contained in memory 805. Execution of the program instructions contained in memory causes the processor to perform the process steps and generate the results described herein, or equivalents thereof. One or more processors in a multi-processing arrangement can also be employed to execute the program instructions. In alternative embodiments, hard-wired circuitry can be used in place of or in combination with software instructions to implement the example embodiments. Thus, embodiments of the present invention are not limited to any specific combination of hardware circuitry and software.

Moreover, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Figure 9:
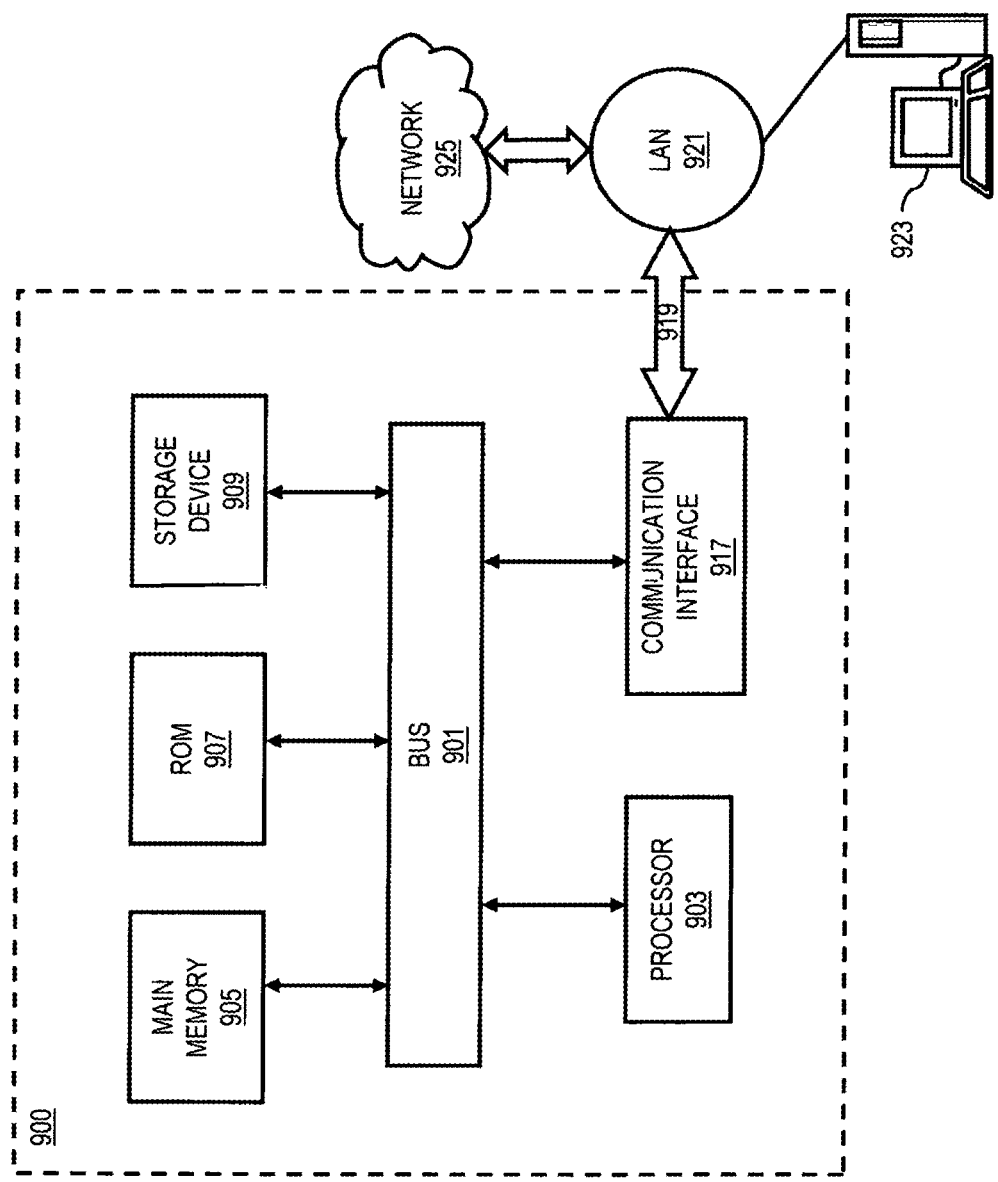
FIG. 9 illustrates a block diagram of a computer system implementing aspects of accurate streaming media caching approaches, in accordance with example embodiments.

FIG. 9 illustrates a block diagram of a computer system implementing aspects of effective and accurate content identification for caching of adaptive video streaming, in accordance with example embodiments of the present invention. The computer system 900 includes a bus 901 or other communication mechanism for communicating information, and a processor 903 coupled to the bus for processing information. The computer system also includes main memory 905, such as a random access memory (RAM) or other dynamic storage device, coupled to the bus for storing information and instructions to be executed by the processor. Main memory can also be used for storing temporary variables or other intermediate information during execution of instructions to be executed by the processor. The computer system further includes a read only memory (ROM) 907 or other static storage device coupled to the bus for storing static information and instructions for the processor. A storage device 909, such as a magnetic disk or optical disk, is additionally coupled to the bus for storing information and instructions.

According to one embodiment of the invention, dynamic and flexible approaches for application layer traffic rate shaping for adaptive media streaming, are provided by the computer system 900 in response to the processor 903 executing an arrangement of instructions contained in main memory 905. Such instructions can be read into main memory from another computer-readable medium, such as the storage device 909. Execution of the arrangement of instructions contained in main memory causes the processor to perform the process steps described herein. One or more processors in a multi-processing arrangement may also be employed to execute the instructions contained in main memory. In alternative embodiments, hard-wired circuitry is used in place of or in combination with software instructions to implement the embodiment of the present invention. Thus, embodiments of the present invention are not limited to any specific combination of hardware circuitry and software.

The computer system 900 also includes a communication interface 917 coupled to bus 901. By way of example, the communication interface provides a two-way data communication coupling to a network link 919 connected to a local network 921. The communication interface, for example, may be a digital subscriber line (DSL) card or modem, an integrated services digital network (ISDN) card, a cable modem, or other modem to provide a data communication connection to a corresponding type of telephone line. As another example, communication interface may be a local area network (LAN) card (e.g. for Ethernet™ or an Asynchronous Transfer Mode (ATM) network) to provide a data communication connection to a compatible LAN, or an optical modem configured to provide communications with a fiber-optic network link. Wireless links can also be implemented. Further, the communication interface, for example, includes peripheral interface devices, such as a Universal Serial Bus (USB) interface, a PCMCIA (Personal Computer Memory Card International Association) interface, etc.

The network link 919 typically provides data communication through one or more networks to other data devices. For example, the network link provides a connection through local network 921 to a host computer 923, which has connectivity to a network 925, such as a private wide area network (WAN) or a public WAN (e.g., the Internet), or to data equipment operated by service provider. The computer system 900 sends messages and receives data, including program code, through the network(s), via the network link 919 and the communication interface 917. In the Internet example, a server (not shown) might transmit requested code or content belonging to an application program or service for implementing an embodiment of the present invention via the network 925. The processor 903 executes the transmitted code while being received and/or store the code in storage device, or other non-volatile storage for later execution.

Additionally, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   receiving, by a caching proxy device, a first request message of a respective client device, the first request message requesting a current content segment from a sequence of data segments of a data file for a current streaming data session of the client device;
   determining that a NewVideoFlag indicates that the sequence of data segments of the data file for the current streaming data session associated with the first request message is not currently being, and has not previously been, stored in a cache storage by the caching proxy device;
   forwarding the first request message to a content server, and receiving a first response message in response to the first request message, the first response message including the requested current content segment;
   determining that a SegmentID of the received current content segment does not match that of any content segments stored in the cache storage;
   setting the NewVideoFlag to indicate that the sequence of data segments of the data file for the current streaming data session associated with the first request message is currently being stored in the cache storage by the caching proxy device;
   generating a global video file identifier (cVideoFileID) to identify the data file for the current streaming data session currently being stored in the cache storage by the caching proxy device;

storing at least the current content segment in the cache storage, and updating cache bookkeeping data to associate the cached current content segment with the SegmentID thereof and with the generated cVideoFileID; and providing the first response message to the client device.

2. The method according to claim 1, further comprising:

receiving, by the caching proxy device, a second request message of the client device, the second request message requesting a subsequent content segment from the sequence of data segments of the data file for the current streaming data session of the client device;

determining that the NewVideoFlag indicates that the sequence of data segments of the data file for the current streaming data session associated with the second request message is currently being stored in the cache storage by the caching proxy device;

determining that a SegmentID of the requested subsequent content segment matches that of a content segment stored in the cache storage;

determining that the cVideoFileID matches that of the content segment stored in the cache storage with the matching SegmentID; and providing the content segment with the matching SegmentID and the matching cVideoFileID from the cache storage as a second response message to the client device.

3. The method according to claim 1, further comprising:

receiving, by the caching proxy device, a second request message of the client device, the second request message requesting a subsequent content segment from the sequence of data segments of the data file for the current streaming data session of the client device;

determining that the NewVideoFlag indicates that the sequence of data segments of the data file for the current streaming data session associated with the second request message has previously been identified and mapped to one or more respective global video file identifiers;

determining that a Segment ID of the requested subsequent content segment does not match that of any of the cached content segments;

forwarding the second request message to a content server, and receiving a second response message in response to the second request message, the second response message including the requested subsequent content segment;

storing the subsequent content segment in the cache storage; and providing the second response message to the client device.

4. The method according to claim 1, further comprising:

determining whether the received subsequent content segment is a last data segment of the data file for the current streaming data session;

in a case where it is determined that the received subsequent content segment is the last data segment of the data file for the current streaming data session, the method further comprises setting the NewVideoFlag to indicate that the sequence of data segments of the data file for the current streaming data session has not been identified and mapped to the one or more respective global video file identifiers; and in a case where it is determined that the received subsequent content segment is not the last data segment of the data file for the current streaming data session, the method proceeds to the step of providing the second response message to the client device.

5. The method according to claim 1, further comprising:

determining that the SegmentID of the received current content segment does not match that of any content segments stored in the cache storage.

6. The method according to claim 5, further comprising:

determining, based on a result from a hash function applied to data content of the current content segment, that the hash result matches a result of the hash function applied to a further one of the cached content segments;

setting the NewVideoFlag to indicate that the sequence of data segments of the data file for the current streaming data session has previously been identified and mapped to one or more respective global video file identifiers;

updating the cache bookkeeping data to associate a video file ID of the current content segment with a global video file ID associated with the further one of the cached content segments with the matching hash; and providing the further one of the cached content segments with the matching hash to the client device.

7. The method according to claim 5, further comprising:

determining, based on a result from a hash function applied to data content of the current content segment, that the hash result does not match a result of the hash function applied to any of the cached content segments;

setting the NewVideoFlag to indicate that the sequence of data segments of the data file for the current streaming data session has not previously been identified and mapped to one or more respective global video file identifiers;

generating a new global video file ID to identify the data file for the current streaming data session;

storing the current content segment in the cache storage, and updating cache bookkeeping data to associate a video file ID of the current content segment now stored in the cache with the new global video file ID; and providing the first response message to the client device.

8. A streaming media caching proxy device, comprising:

a client interface configured to receive a first request message of a respective client device, the first request message requesting a current content segment from a sequence of data segments of a data file for a current streaming data session of the client device;

a processor configured to (i) determine that a NewVideoFlag indicates that the sequence of data segments of the data file for the current streaming data session associated with the first request message is not currently being, and has not previously been, stored in a cache storage by the caching proxy device, (ii) forward the first request message to a content server, and receiving a first response message in response to the first request message, the first response message including the requested current content segment, (iii) determine that a SegmentID of the received current content segment does not match that of any content segments stored in the cache storage, (iv) set the NewVideoFlag to indicate that the sequence of data segments of the data file for the current streaming data session associated with the first request message is currently being stored in the cache storage by the caching proxy device, (v) generate a global video file identifier (cVideoFileID) to identify the data file for the current streaming data session currently being stored in the cache storage by the caching proxy device, (vi) store at least the current content segment in the cache storage, and updating cache bookkeeping data to associate the cached current content segment with the SegmentID thereof and with the generated cVideoFileID, and (d) provide the first response message to the client device.

9. The streaming media caching proxy device according to claim 8, wherein:

the client interface is further configured to receive a second request message of the client device, the second request message requesting a subsequent content segment from the sequence of data segments of the data file for the current streaming data session of the client device;

the processor is further configured to determine that the NewVideoFlag indicates that the sequence of data segments of the data file for the current streaming data session associated with the second request message is currently being stored in the cache storage by the caching proxy device;

the processor is further configured to determine that a SegmentID of the requested subsequent content segment matches that of a content segment stored in the cache storage;

the processor is further configured to determine that the cVideoFileID matches that of the content segment stored in the cache storage with the matching SegmentID; and the processor is further configured to provide the content segment with the matching SegmentID and the matching cVideoFileID from the cache storage as a second response message to the client device.

10. The streaming media caching proxy device according to claim 8, wherein:

the client interface is further configured to receive a second request message of the client device, the second request message requesting a subsequent content segment from the sequence of data segments of the data file for the current streaming data session of the client device;

the processor is further configured to determine that the NewVideoFlag indicates that the sequence of data segments of the data file for the current streaming data session associated with the second request message has previously been identified and mapped to one or more respective global video file identifiers;

the processor is further configured to determine that a Segment ID of the requested subsequent content segment does not match that of any of the cached content segments;

the processor is further configured to forward the second request message to a content server, and receiving a second response message in response to the second request message, the second response message including the requested subsequent content segment;

the processor is further configured to store the subsequent content segment in the cache storage; and the processor is further configured to provide the second response message to the client device.

11. The streaming media caching proxy device according to claim 8, wherein:

the processor is further configured to determine whether the received subsequent content segment is a last data segment of the data file for the current streaming data session; and in a case where it is determined that the received subsequent content segment is the last data segment of the data file for the current streaming data session, the processor is further configured to the NewVideoFlag to indicate that the sequence of data segments of the data file for the current streaming data session has not been identified and mapped to the one or more respective global video file identifiers; and in a case where it is determined that the received subsequent content segment is not the last data segment of the data file for the current streaming data session, the processor is further configured to proceed to the providing the second response message to the client device.

12. The streaming media caching proxy device according to claim 8, wherein:

the processor is further configured to determine that the SegmentID of the received current content segment does not match that of any content segments stored in the cache storage.

13. The streaming media caching proxy device according to claim 12, wherein:

the processor is further configured to determine, based on a result from a hash function applied to data content of the current content segment, that the hash result matches a result of the hash function applied to a further one of the cached content segments;

the processor is further configured to set the NewVideoFlag to indicate that the sequence of data segments of the data file for the current streaming data session has previously been identified and mapped to one or more respective global video file identifiers;

the processor is further configured to update the cache bookkeeping data to associate a video file ID of the current content segment with a global video file ID associated with the further one of the cached content segments with the matching hash; and the processor is further configured to provide the further one of the cached content segments with the matching hash to the client device.

14. The streaming media caching proxy device according to claim 12, wherein:

the processor is further configured to determine, based on a result from a hash function applied to data content of the current content segment, that the hash result does not match a result of the hash function applied to any of the cached content segments;

the processor is further configured to set the NewVideoFlag to indicate that the sequence of data segments of the data file for the current streaming data session has not previously been identified and mapped to one or more respective global video file identifiers;

the processor is further configured to generate a new global video file ID to identify the data file for the current streaming data session; and the processor is further configured to provide the first response message to the client device.

* * * * *